United States Patent
Belanger (10) Patent No.: US 7,430,900 B2
(45) Date of Patent: Oct. 7, 2008

(54) INFLATION SYSTEM

(76) Inventor: John Belanger, 205 Wells St., Crown Point, IN (US) 46307

( * ) Notice: Subject to any disclaimer, the term of this patent is extended or adjusted under 35 U.S.C. 154(b) by 0 days.

(21) Appl. No.: 11/278,781

(22) Filed: Apr. 5, 2006

(65) Prior Publication Data

US 2007/0237652 A1    Oct. 11, 2007

(51) Int. Cl.
*G01M 17/02* (2006.01)
(52) U.S. Cl. .................. 73/146; 73/146.2; 340/442
(58) Field of Classification Search ........ 73/146–146.8; 340/442–447
See application file for complete search history.

(56) References Cited

U.S. PATENT DOCUMENTS

| | | | |
|---|---|---|---|
| 3,994,312 A | 11/1976 | Tanner | |
| 4,080,105 A | 3/1978 | Connell | |
| 4,445,527 A | 5/1984 | Leimbach | |
| 4,614,479 A | 9/1986 | Liu | |
| 4,694,409 A | 9/1987 | Lehman | |
| 4,905,742 A | 3/1990 | Mohs | |
| 4,998,438 A | 3/1991 | Martin | |
| 5,054,511 A | 10/1991 | Tuan | |
| 5,125,800 A | 6/1992 | Wong | |
| 5,249,609 A | 10/1993 | Walker | |
| 5,267,363 A | 12/1993 | Chaffee | |
| 5,365,967 A | 11/1994 | Moore | |
| 5,429,166 A | 7/1995 | Anzai | |
| 5,587,698 A * | 12/1996 | Genna | 340/442 |
| 5,611,875 A | 3/1997 | Bachhuber | |
| 5,891,277 A | 4/1999 | Bachhuber | |
| 5,988,245 A | 11/1999 | Rosenberg | |
| 6,067,850 A | 5/2000 | Lang | |
| 6,296,010 B1 | 10/2001 | DeLauer | |
| 6,705,360 B1 | 3/2004 | Bonzer | |
| 6,711,955 B1 | 3/2004 | Wilkerson | |
| 6,748,797 B2 * | 6/2004 | Breed et al. | 73/146 |
| 6,758,088 B2 * | 7/2004 | Claussen et al. | 73/146 |
| 6,826,951 B1 * | 12/2004 | Schuessler et al. | 73/146 |
| 6,838,983 B1 | 1/2005 | Wong | |
| 6,966,220 B2 * | 11/2005 | Yueh | 73/146 |
| 6,970,076 B1 | 11/2005 | Starkey | |
| 6,972,673 B2 | 12/2005 | Yamagiwa | |
| 6,972,691 B2 | 12/2005 | Okubo | |
| 6,993,962 B1 * | 2/2006 | Ko | 73/146.5 |
| 7,049,948 B2 * | 5/2006 | Yagi et al. | 340/442 |

* cited by examiner

*Primary Examiner*—Edward Lefkowitz
*Assistant Examiner*—Jermaine Jenkins
(74) *Attorney, Agent, or Firm*—Galbreath Law Offices, P.C.; John A. Galbreath (57) ABSTRACT

An inflation system is disclosed for automobile tires, bicycle tires, and other inflatable articles, wherein the inflating pump reads information from a microchip associated with the valve stem in the inflatable article, in order to inflate the tire or other inflatable article to the correct pressure. In one embodiment, the microchip contains one pressure level which the inflating pump reads and fills the inflatable article to. In another embodiment, the microchip contains several different pressure levels—based on different conditions—which the inflating pump reads, and the pump fills the inflatable article to the particular pressure level selected by the user.

20 Claims, 7 Drawing Sheets

INFLATION SYSTEM

FIELD OF THE INVENTION

The invention is in the area of inflation systems for automobile tires, bicycle tires, and other inflatable articles.

DESCRIPTION OF THE RELATED ART

The prior art discloses various tire pressure monitoring systems, systems that make tire inflation easier, or valve stems with pressure-relief means to limit the inflation pressure. However, none of these patents exhibit the features of the present invention—that is, an inflation system wherein the inflating pump reads information from a microchip associated with the valve stem, in order to inflate the tire or other inflatable article to the correct pressure.

U.S. Pat. No. 4,445,527 to Leimbach; U.S. Pat. No. 5,988,245 to Rosenberg; U.S. Pat. No. 6,296,010 to DeLauer; U.S. Pat. No. 5,365,967 to Moore; U.S. Pat. No. 5,054,511 to Tuan; and U.S. Pat. No. 3,994,312 to Tanner all show tire valve stems or valve stem extensions that limit the inflation pressure of the tire. However, they all use mechanical means to limit the pressure (e.g., springs or balls that block a pressure relief port until the desired inflation pressure is reached. Some may also be used to automatically release excess air pressure that develops as a result of outside temperature changes or simply from driving the automobile. None of these patents disclose a microchip associated with the valve stem that has a pre-set inflation pressure on it, and that is read by the nozzle of an air pump so that the air pump will automatically shut off when the pre-set pressure is reached.

In addition to the above, U.S. Pat. No. 4,905,742 to Mohs; U.S. Pat. No. 4,694,409 to Lehman; U.S. Pat. No. 6,067,850 to Lang; U.S. Pat. No. 6,838,983 to Wong; and U.S. Pat. No. 6,711,955 to Wilkerson show inflation aid systems that automatically shut off the flow of high pressure filling air when a pre-set pressure is reached. These systems are generally micro-processor or micro-controller based—that is, the pre-set pressure is on the microprocessor or its associated memory contained in the air pump, or is entered into a keypad by the user. However, none of these systems show the pre-set pressure being on a microchip or other electronic component associated with the tire valve stem, as in the invention.

Finally, U.S. Pat. No. 6,972,691 to Okubo; U.S. Pat. No. 6,972,673 to Yamagiwa; and U.S. Pat. No. 6,970,076 to Starkey exemplify tire pressure monitoring systems that monitor the tire pressure via sensors or transmitters that are often located in or attached to the valve stem, and either add air when pressure is low or issue an alert to the driver. These systems involve a pre-set tire pressure, in the sense that there is a particular pressure at which the system keeps the tires. But the pre-set pressure does not reside on a microchip or other electronic component contained in the valve stem, as in the invention. Instead, it is pre-set in the main control unit or entered by the driver. In systems like these that have an air pump to replenish lost air, the air pump nozzle is permanently connected to the valve stem—but the nozzle does not "read" the inflation pressure from the valve stem.

SUMMARY OF THE INVENTION:

The invention is an inflation system for automobile tires, bicycle tires, and other inflatable articles, wherein the inflating pump reads information from a microchip associated with the valve stem in the inflatable article, in order to inflate the tire or other inflatable article to the correct pressure.

Anyone who has used a conventional air pump, for example at a service station, to inflate his tires has experienced the difficulty involved in trying to inflate the tires to the correct pressure. This often involves a trial and error process whereby the user injects some air, checks the pressure with a hand-held pressure gauge, injects some more air or bleeds off some air, checks the pressure again, and so on. This repetitive process is frustrating and time-consuming.

Some air pumps enable the user to pre-set the inflation pressure via a dial or other means. However, this type of pump often inaccurately fills the tire, and the means used to indicate that the tire is full (rings, buzzers, etc.) can be difficult for a user to interpret. And of course, this type of pump requires the user to know what the proper inflation pressure is and set the pump to that pressure. The user cannot just fill the tire until the tire itself (via the microchip associated with the valve stem) shuts off the air flow, as in the invention.

In addition to simply storing one predetermined pressure level that the air pump reads, the microchip of the invention can also store front and rear inflation pressures, and the user can indicate whether he desires a front or rear inflation pressure by pushing buttons on the pump nozzle or by entering this preference into the system by other means. This feature addresses the common situation wherein the correct inflation pressure differs, depending on whether a vehicle tire on mounted on the front or rear axle.

The microchip of the invention can also store information about the correct pressure level for a variety of circumstances—for example, the correct pressures for various passenger or vehicle weights, a "sport" or performance pressure level, a "luxury" pressure level, an "economy" pressure level, etc. For example, if desired the user can input passenger weight information into the air pump, and the air pump—after reading the correct pressure for that passenger weight from the microchip—can then fill the tire to the correct pressure. Similarly, the user can indicate via the air pump that he desires a "sport" pressure level, and the air pump—after reading the sport pressure level from the microchip—can then fill the tire to the sport pressure.

Several objects and advantages of the invention are:

It is an object of the invention to provide an inflation system and method that eliminates the guesswork and trial and error associated with filling an inflatable article to the correct pressure.

It is a further object of the invention to provide a system and method wherein the microchip associated with the valve stem contains one pressure level which the inflating pump reads and fills the inflatable article to.

It is a further object of the invention to provide a system and method wherein the microchip contains several different pressure levels—based on different conditions or circumstances—which the inflating pump reads, and the pump fills the inflatable article to one of the pressure levels based on input by the user.

Further objects and advantages of the invention will become apparent from a consideration of the ensuing description and drawings.

DETAILED DESCRIPTION OF THE INVENTION

Figure 1:
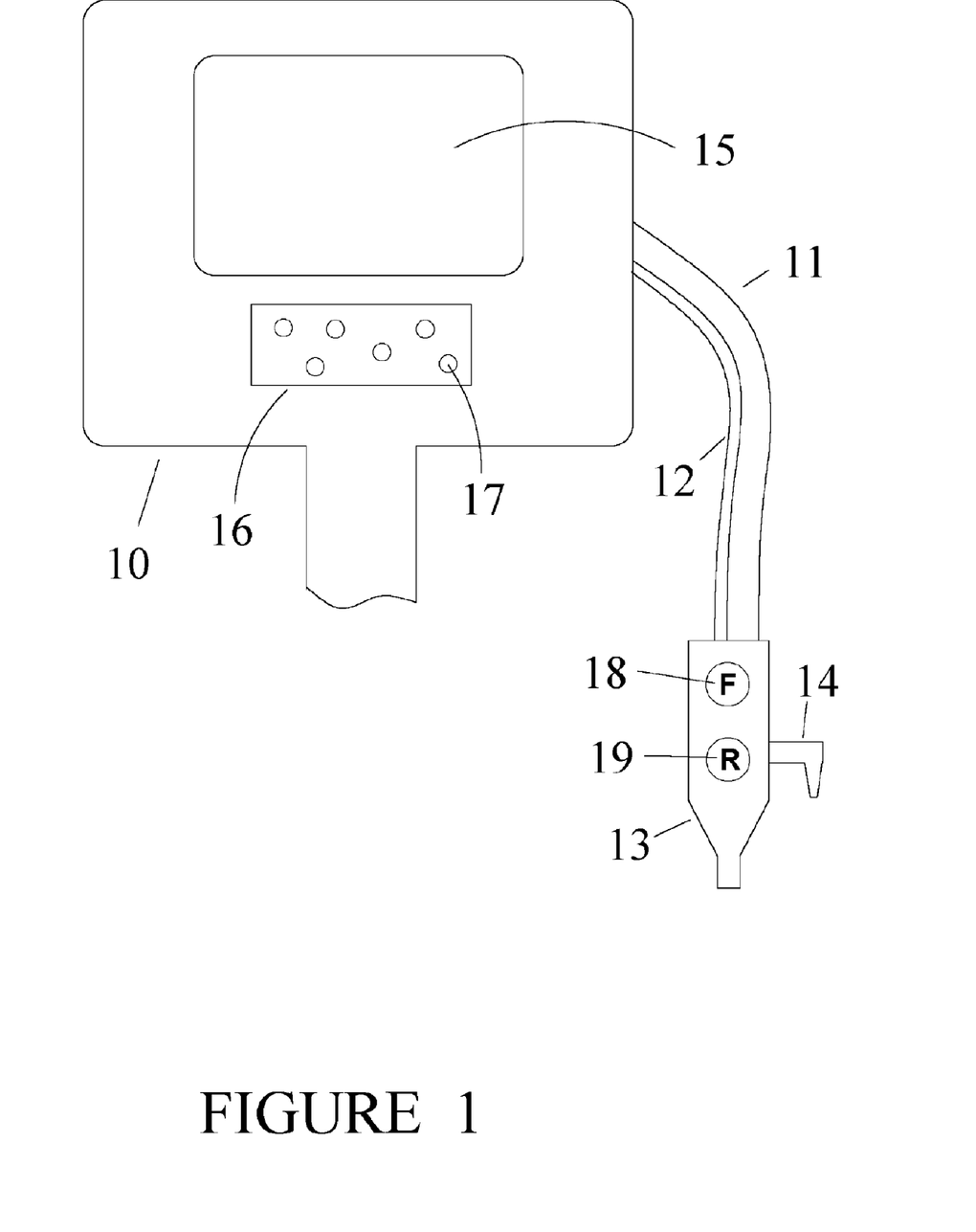
FIG. 1 illustrates the air pump portion of the inflation system, comprising a main air pump body connected via an air hose and electrical wires to a nozzle assembly with an antenna to read the microchip.

The following provides a list of the reference characters used in the drawings:
10. Pump body
11. Air hose
12. Electrical wires
13. Nozzle assembly
14. Transceiver antenna
15. Display screen
16. Control panel
17. Input button
18. Front button
19. Rear button
20. Valve stem
21. Microchip
22. Microchip antenna
23. Tire
24. Accessing step
25. Placing step
26. Reading step
27. Inflating step
28. Shutoff step
29. Indicating step
30. Wheel FIG. 1 illustrates the air pump portion of the inflation system. The air pump portion comprises a pump body 10 connected via an air hose 11 and electrical wires 12 to a nozzle assembly 13 having a transceiver and a transceiver antenna 14 connected to the transceiver. Pump body 10 has a display screen 15 and a control panel 16, with various input buttons 17 located on control panel 16 for the purpose of allowing the user to input information into the system. It should be understood that a compressor is either contained within or associated with pump body 10, such that pump body 10 can supply compressed air through air hose 11 to nozzle assembly 13 in order to inflate an item. It should also be understood that the inflation system of the invention also includes a pressure transducer or other means of sensing the current inflation pressure of the inflatable article (as opposed to the desired or correct inflation pressure), and that this pressure transducer can be located within pump body 10 or nozzle assembly 13. Nozzle assembly 13 further has a front button 18 located thereon, for the user to indicate to the system that he is filling a tire on the front axle of a vehicle; and also a rear button 19, for the user to indicate to the system that he is filling a tire on the rear axle of a vehicle. Electrical wires 12 serve to communicate data between pump body 10 and nozzle assembly 13, by way of non-limiting example including: the inflation information on the microchip 21 shown in FIGS. 2 & 3 and discussed below; the current pressure level of the inflatable article; the front button 18 or rear button 19 selection by the user; and any other desired inflation information that is input by the user via display screen 15 or control panel 16. Electrical wires 12 also provide power to nozzle assembly 13, for operation of the electronics contained in nozzle assembly 13, including the transceiver that reads the microchip.

Figure 2:
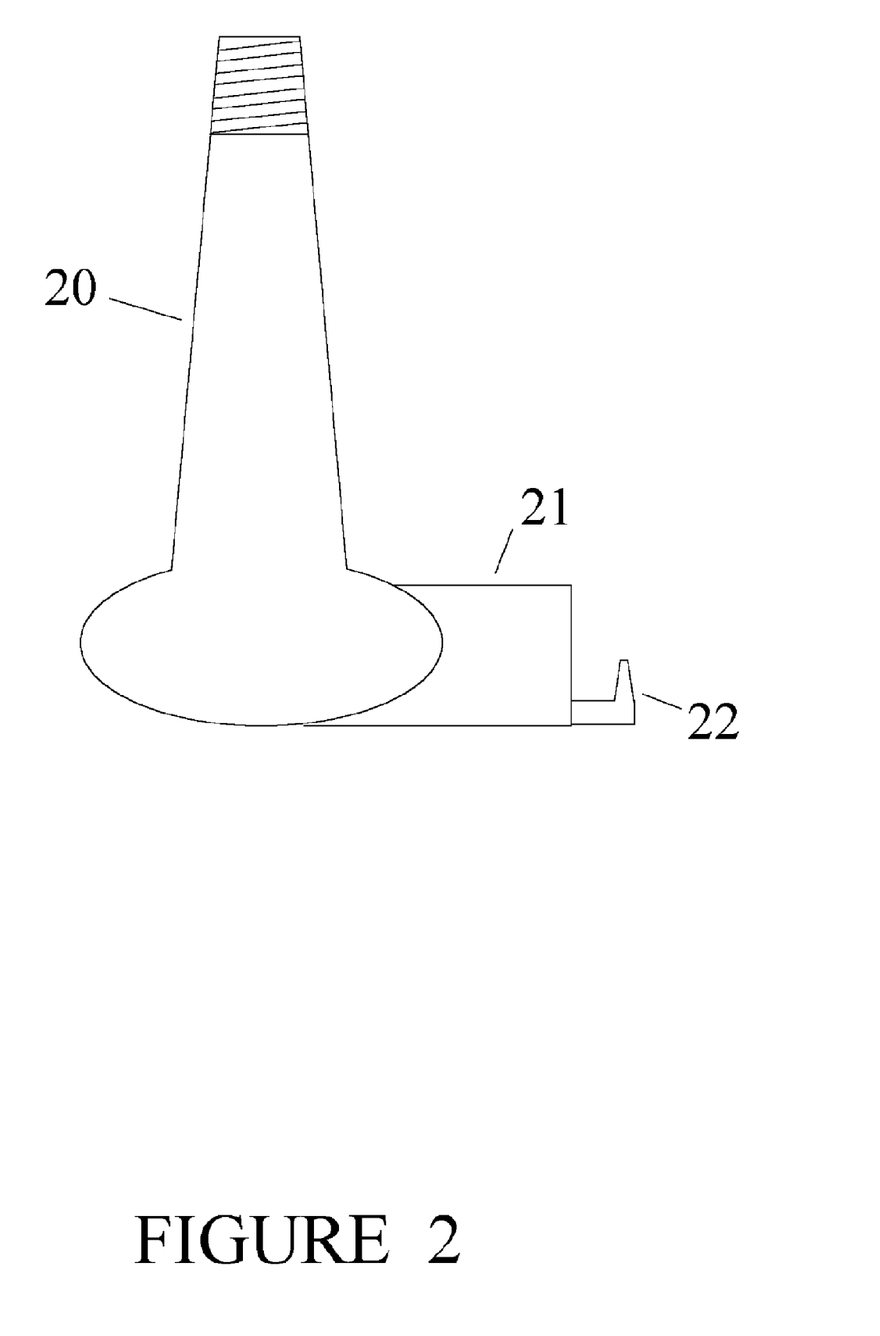
FIG. 2 illustrates the valve stem portion of the inflation system.
Figure 3:
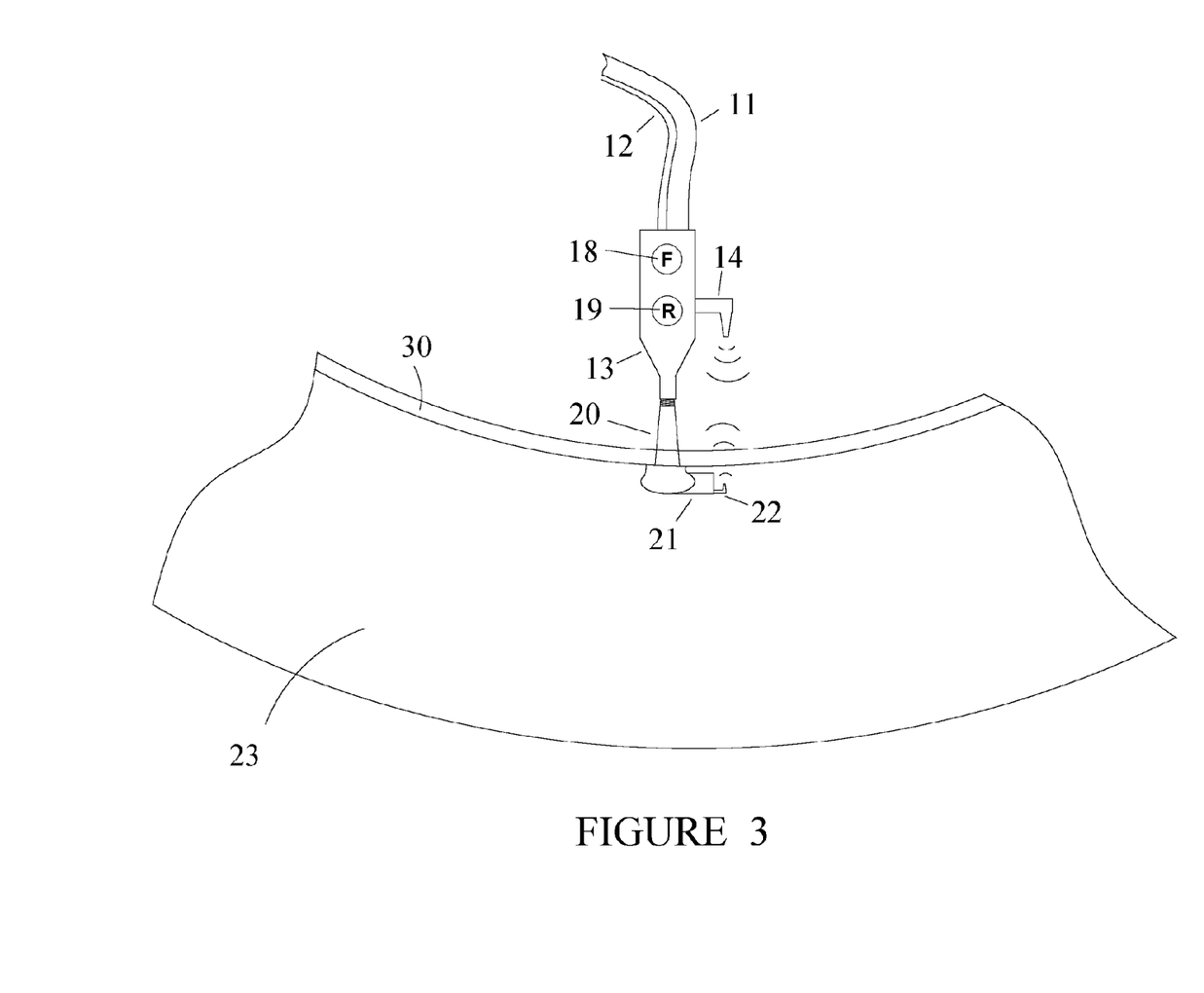
FIG. 3 is a side view of the nozzle assembly in place over the valve stem, wherein the nozzle assembly reads inflation information from the microchip.

FIG. 2 illustrates the valve stem portion of the inflation system. A valve stem 20 has a microchip 21 attached thereto. Microchip 21 contains information regarding the proper inflation pressure for a given situation or circumstance. Microchip 13 also contains circuitry to store the inflation information and make any necessary pressure-related calculations, and a microchip antenna 22 to communicate the inflation information to the system via transceiver antenna 14. In the simplest form of the invention, the information on microchip 21 consists of just one inflation pressure, which is read by nozzle assembly 13 as shown in FIG. 3. Pump body 10 then fills the vehicle tire or other inflatable article to that pressure, and then automatically shuts off.

However, in alternative embodiments, additional information comprising a number of different pressure levels is contained on microchip 21. In one such alternative embodiment, microchip 21 contains both a front and a rear inflation pressure, corresponding respectively to the correct pressures for a tire on the front and rear axles of a particular vehicle. The user indicates whether he desires the tire to be filled to the front or the rear inflation pressure by pressing either front button 18 or rear button 19. Pump body 10 then fills the vehicle tire to that pressure, and shuts off automatically.

In another alternative embodiment, microchip 21 also contains a number of correct pressure levels corresponding to various vehicle passenger weights. The user inputs the vehicle's passenger weight into the system via display screen 15 and control panel 16, and the system—via transceiver antenna 14 on nozzle assembly 13—reads the correct pressure corresponding to the user-inputted passenger weight from microchip 21. Pump body 10 then fills the vehicle tire to that pressure, and shuts off automatically.

In yet another alternative embodiment, microchip 21 also contains a "sport" pressure level, which is typically a higher inflation pressure that provides a firmer ride and more precise vehicle handling; a "luxury" pressure level, which is typically a lower inflation pressure that provides a softer ride; and/or an "economy" pressure level, which is typically a higher inflation pressure that yields greater fuel economy. The user chooses a sport, luxury, or economy mode via display screen 15 and control panel 16, and the system—via transceiver antenna 14 on nozzle assembly 13—reads the correct pressure for the chosen driving mode from microchip 21. Pump body 10 then fills the vehicle tire to that pressure, and shuts off automatically.

FIG. 3 is a side view of nozzle assembly 13 in place over valve stem 20. Valve stem 20 is installed in a wheel 30, around which a tire 23 is mounted. Transceiver antenna 14 on nozzle assembly 13 reads inflation information from microchip 21 via microchip antenna 22. With respect to the form of microchip 21 and the communication method between microchip 21 and the system, it can be appreciated by one or ordinary skill in the art that a number of suitable microchip forms and communication methods may be used. As one example, the microchip can take the form of a radio-frequency identification (RFID) tag or transponder, which have become common for tagging products, animals, or persons. In RFID tagging, microchip containing information is placed under the skin of an animal or person, and that information is subsequently read with a scanning head placed in sufficient proximity to the tag. RFID technology is also used for electronic toll collection.

RFID tags contain silicon chips and antennas to enable them to receive and respond to radio-frequency queries from an RFID transceiver. In the invention, the RFID transceiver would be located in nozzle assembly 13 and would be attached to transceiver antenna 14. There are "active" RFID tags which require an internal power source, and "passive" RFID tags, which require no internal power source. The invention can use either an active or passive RFID tag, although a passive tag is preferred for cost and reliability reasons. In a passive RFID tag, the minute electrical current induced in the tag antenna by the incoming radio frequency signal provides just enough power for the integrated circuit in the tag to power up and transmit a response. Most passive tags signal by backscattering the signal received from the transceiver. The response of a passive RFID tag can contain data stored on the tag chip, and in the invention this data would be the various pressure level information described herein.

Thus it can be appreciated that for convenience's sake, not all of the electronics contained on microchip 21 and in pump body 10 are shown and described. These conventional parts are known in the art, and are assumed to be employed in the invention.

Figure 4:
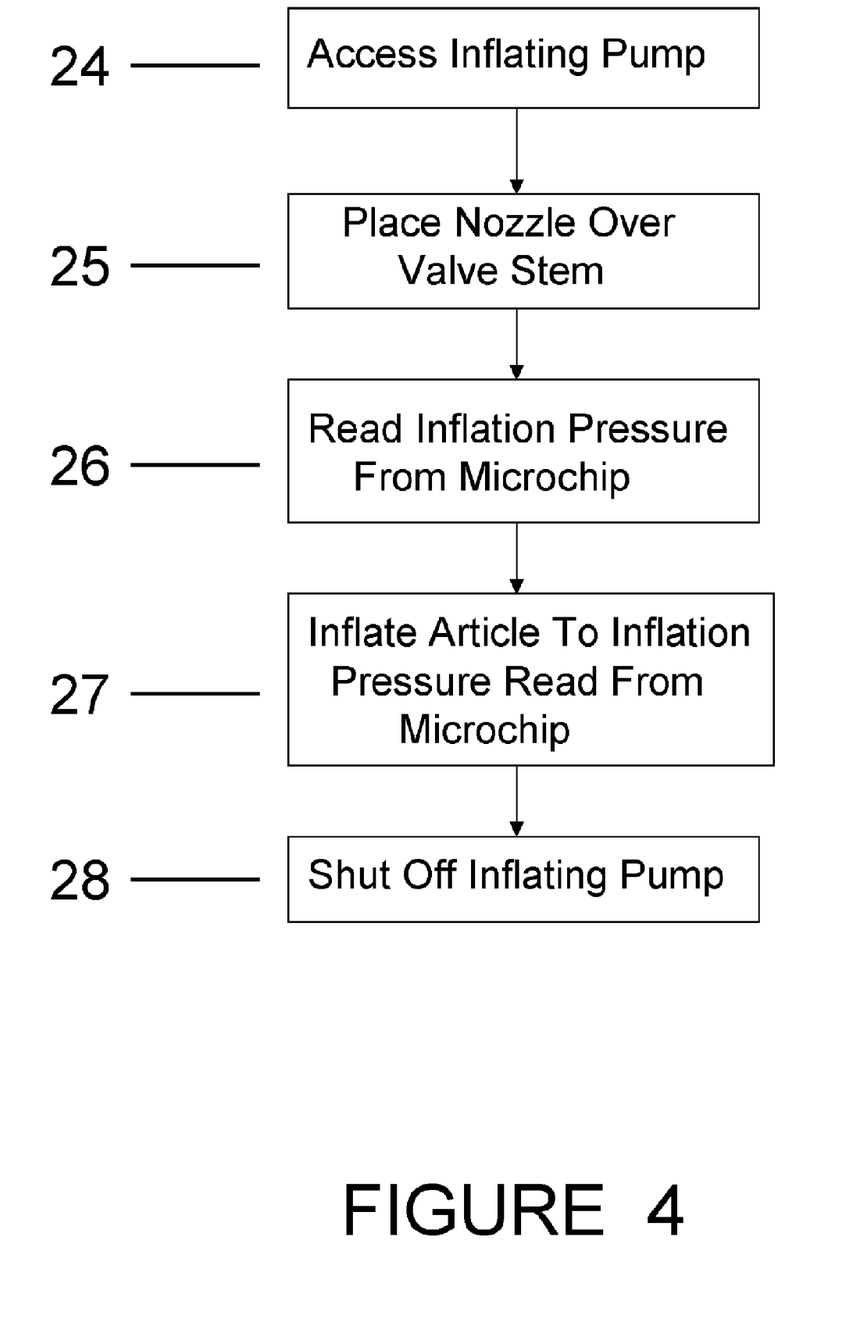
FIG. 4 is a diagram of the steps in the simplest embodiment of the inventive inflation method.

FIG. 4 is a diagram of the steps in the simplest embodiment of the inventive inflation method, wherein the microchip contains one inflation pressure that is read by the system, and the inflatable article is then filled to that pressure. To practice the method, the user first accesses an inflating pump in accessing step 24. Next, in placing step 25, the nozzle of the inflating pump is placed over the valve stem of the inflatable article. This brings the nozzle antenna in sufficient proximity to the valve stem antenna, in order for the system to read the inflation pressure contained on the microchip. In reading step 26, the inflation pressure is read from the microchip. Optionally, the system can indicate to the user, by an indicator light on the nozzle or inflating pump, or by other means, that communication with the microchip has been established. In inflating step 27, the nozzle fills the article to the correct inflation pressure. In shutoff step 28, the inflating pump is shut off, either automatically by the system or manually by the user. It should be noted that in the case where the microchip is not attached to the valve stem, but rather located elsewhere, reading step 26 can come before placing step 25.

Figure 5:
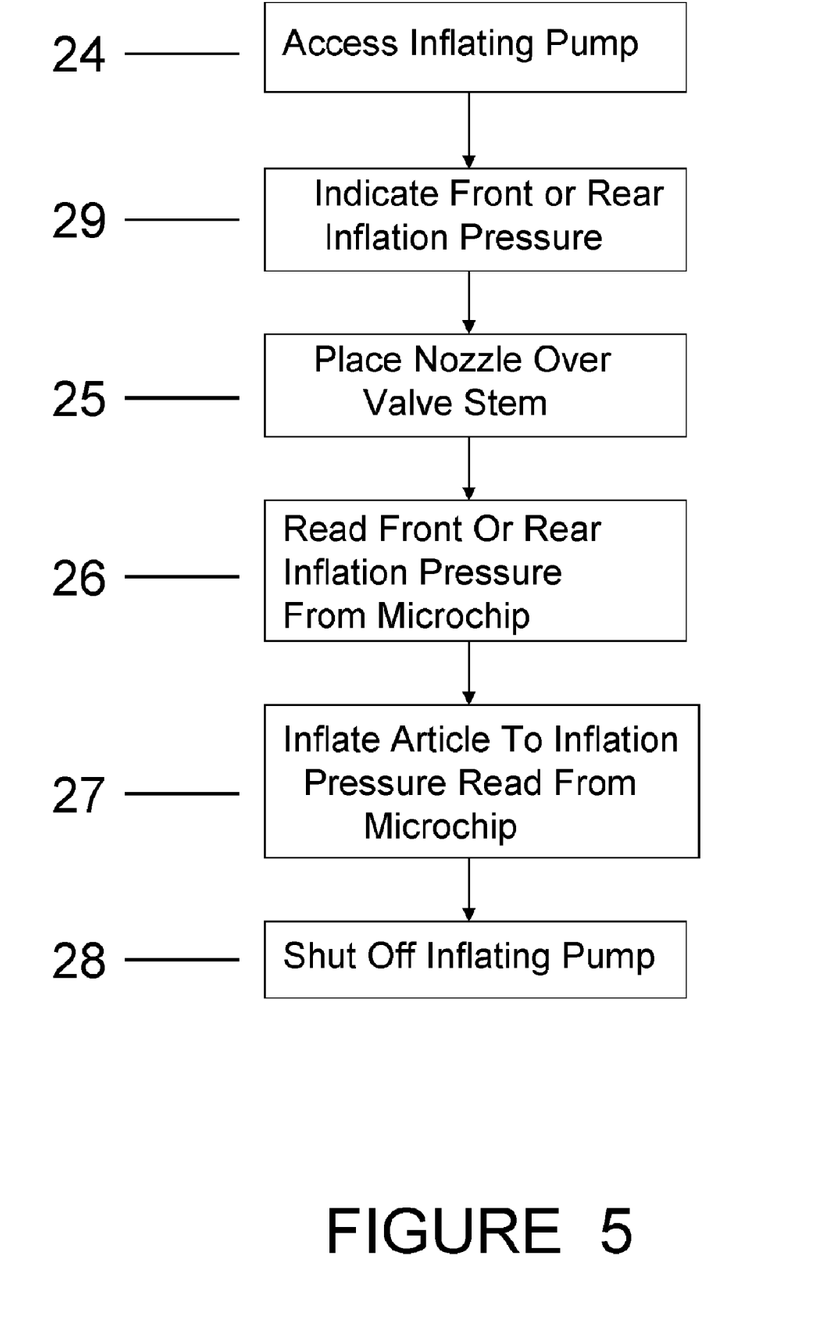
FIG. 5 is a diagram of the steps in an alternative embodiment of the inventive inflation method, wherein the user indicates that a front or rear inflation pressure is desired.

FIG. 5 is a diagram of the steps in an alternative embodiment of the inventive inflation method, wherein the user indicates that a front or rear inflation pressure is desired. To practice this alternative method, the user first accesses an inflating pump in accessing step 24. In indicating step 29, the user indicates his preference for a front or rear inflation pressure via buttons on the nozzle of the inflating pump or by other means. Next, in placing step 25, the nozzle is placed over the valve stem of the inflatable article. This brings the nozzle antenna in sufficient proximity to the valve stem antenna, in order for the system to read the inflation pressures contained on the microchip. In reading step 26, the front or rear inflation pressure is read from the microchip. Optionally, the system can indicate to the user, by an indicator light on the nozzle or inflating pump, by lighting up the front and/or rear buttons on the nozzle, or by other means, that communication with the microchip has been established. In inflating step 27, the nozzle fills the article to the correct inflation pressure. In shutoff step 28, the inflating pump is shut off, either automatically by the system or manually by the user. It should be noted that in the case where the microchip is not attached to the valve stem, but rather located elsewhere, reading step 26 can come before placing step 25. In addition, indicating step 29 can come after placing step 25, and indicating step can even come after reading step 26 in the case where both front and rear inflation pressures are read from the microchip and thereafter the user indicates front or rear.

Figure 6:
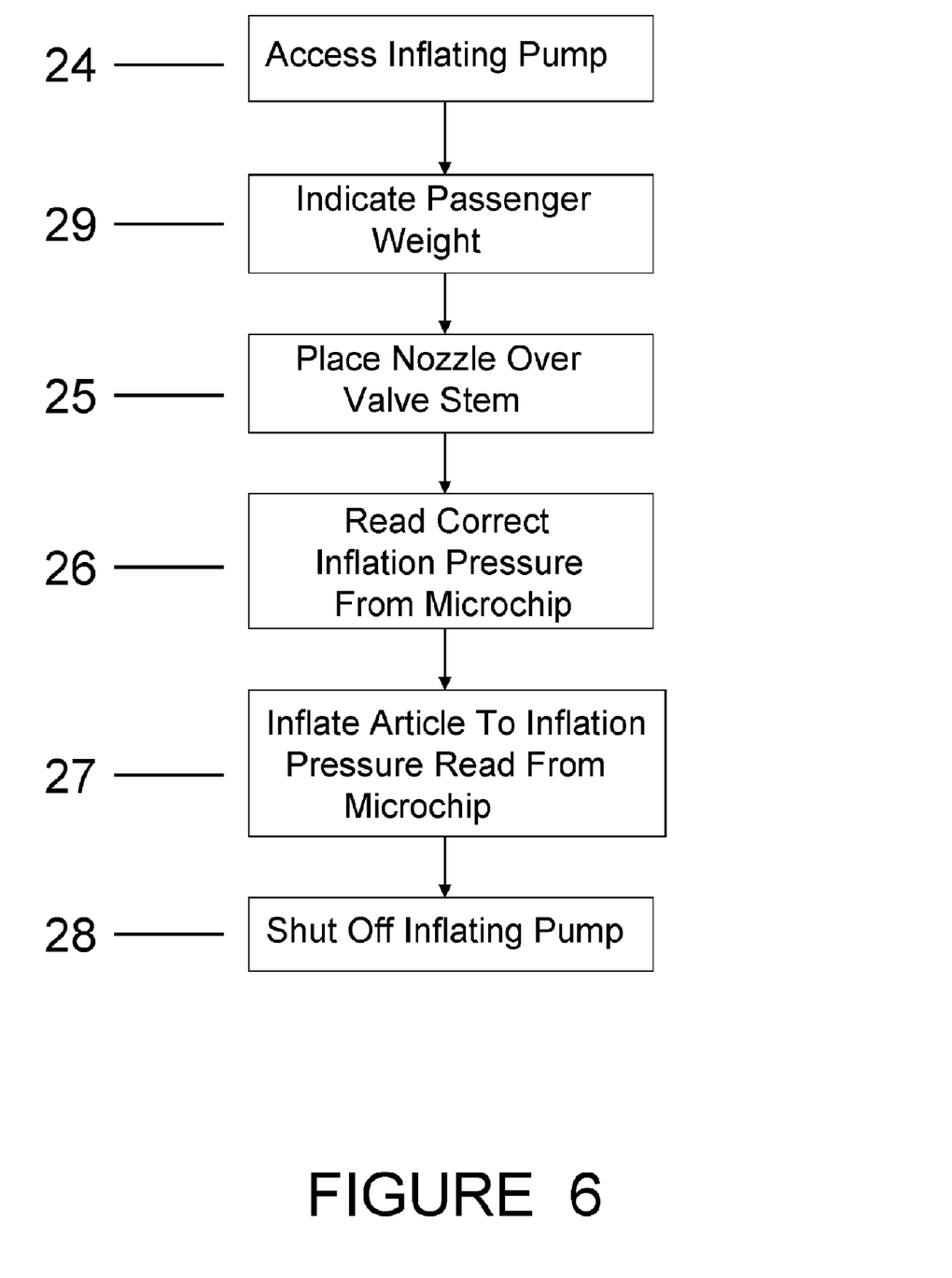
FIG. 6 is a diagram of the steps in another alternative embodiment of the inventive inflation method, wherein the user indicates the passenger weight to the system, and the system then fills the tire to a pressure appropriate for that passenger weight.

FIG. 6 is a diagram of the steps in another alternative embodiment of the inventive inflation method, wherein the user indicates the passenger weight to the system, and the system then fills the tire to a pressure appropriate for that passenger weight. To practice this alternative method, the user first accesses an inflating pump in accessing step 24. In indicating step 29, the user indicates the passenger weight via the display screen and control panel on the pump body, or by other means. Next, in placing step 25, the nozzle is placed over the valve stem of the inflatable article. This brings the nozzle antenna in sufficient proximity to the valve stem antenna, in order for the system to read the inflation pressures contained on the microchip. In reading step 26, the correct pressure for the indicated passenger weight is read from the microchip, or calculated using information read from the microchip. Optionally, the system can indicate to the user, by an indicator light on the nozzle or inflating pump, or by other means, that communication with the microchip has been established. In inflating step 27, the nozzle fills the article to the correct inflation pressure. In shutoff step 28, the inflating pump is shut off, either automatically by the system or manually by the user. It should be noted that in the case where the microchip is not attached to the valve stem, but rather located elsewhere, reading step 26 can come before placing step 25. In addition, indicating step 29 can come after placing step 25, and indicating step can even come after reading step 26 in the case where the inflation pressure information is read from the microchip and thereafter the user indicates the passenger weight.

Figure 7:
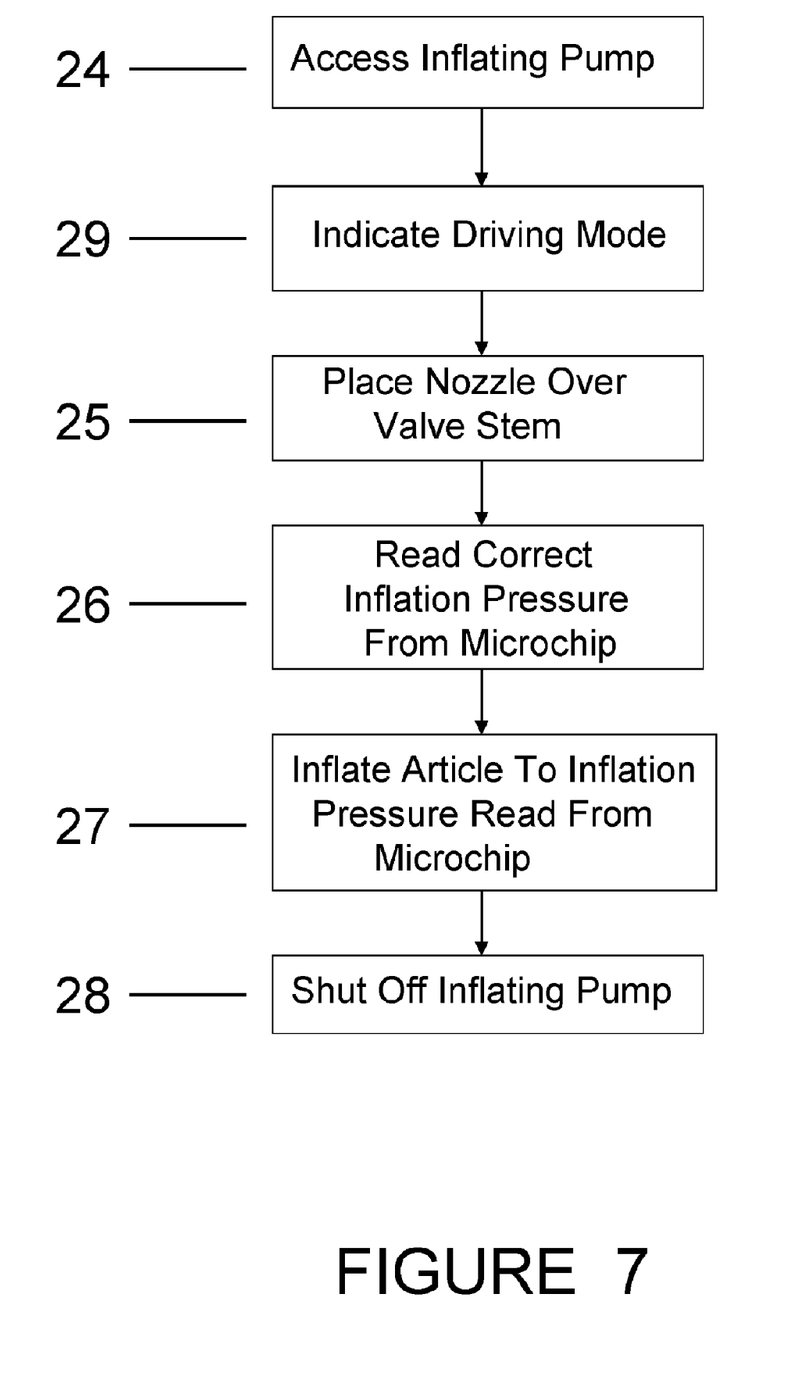
FIG. 7 is a diagram of the steps in yet another alternative embodiment of the inventive inflation method, wherein the user indicates a sport, luxury, economy, or other mode, based on his particular driving circumstances and desires.

FIG. 7 is a diagram of the steps in another alternative embodiment of the inventive inflation method, wherein the user indicates a sport, luxury, economy, or other mode, based on his particular driving circumstances and desires. To practice this alternative method, the user first accesses an inflating pump in accessing step 24. In indicating step 29, the user indicates the driving mode via the display screen and control panel on the pump body, or by other means. Next, in placing step 25, the nozzle is placed over the valve stem of the inflatable article. This brings the nozzle antenna in sufficient proximity to the valve stem antenna, in order for the system to read the inflation pressures contained on the microchip. In reading step 26, the correct pressure for the indicated driving mode is read from the microchip. Optionally, the system can indicate to the user, by an indicator light on the nozzle or inflating pump, or by other means, that communication with the microchip has been established. In inflating step 27, the nozzle fills the article to the correct inflation pressure. In shutoff step 28, the inflating pump is shut off, either automatically by the system or manually by the user. It should be noted that in the case where the microchip is not attached to the valve stem, but rather located elsewhere, reading step 26 can come before placing step 25. In addition, indicating step 29 can come after placing step 25, and indicating step can even come after reading step 26 in the case where the inflation pressure information is read from the microchip and thereafter the user indicates the desired mode.

While the above descriptions contain many specificities, these shall not be construed as limitations on the scope of the invention, but rather as exemplifications of embodiments thereof. Many other variations are possible without departing from the spirit of the invention. Examples of just a few of the possible variations follow:

The inventive system and methods can be used to inflate other articles besides the tire shown and described, including but not limited to air shock absorbers, other inflatable vehicle components, air mattresses, and sports equipment.

The user can input indications and preferences regarding front or rear tire pressure, passenger weight, or driving mode via a "touch screen" on the pump body, instead of using the conventional display screen and control panel shown and described.

The user can input indications and preferences into the system other than those shown and described (front or rear, passenger weight, driving mode). These user-input indications would work with and make use of the information residing on the microchip.

The inflating pump can deliver any compressible fluid to the inflatable article, and not just air. As just a few examples, oxygen, nitrogen, other gases and fluids, etc. can be delivered.

The user can make a front/rear indication by means other than nozzle assembly buttons, including but not limited to input through the control panel and display screen, or a touch screen. In addition, the front or rear indication is not confined merely to tires—for example, it may also be used to indicate whether a front or rear inflation pressure is desired for air shock absorbers or other inflatable vehicle-related equipment.

The microchip can also include an internal air temperature sensor. In this way, the microchip can allow the system to correct for the temperature of the air already inside the tire, so that a "hot" tire will be filled to a pressure which will be the correct "cold" pressure after the tire has cooled.

The system can also calculate the correct air pressure for a given user-inputted passenger weight using an algorithm supplied by the microchip or the inflating pump, or the system can interpolate/extrapolate the correct air pressure for a given user-inputted passenger weight using the various pressure levels contained on the microchip.

User indications can be combined—that is, multiple user indications can be made, and the correct inflation pressure determined using the combined user indications. By way of non-limiting examples, the system can inflate a tire to the correct pressure for a certain passenger weight and a "sport" setting, based on information contained on the microchip; or the system can inflate a tire to the correct pressure for a front tire at a certain passenger weight and a "luxury" setting, based on information contained on the microchip.

The microchip can be attached to the valve stem such that the microchip is inside the tire or inflatable article after the valve stem is installed, or the microchip can be attached to the valve stem such that the microchip is outside the tire or inflatable article after the valve stem is installed. The microchip can also be positioned proximate to the valve stem or in some other location, including but not limited to the inner or outer surface of the tire or wheel, or the inner or outer surface of the inflatable object. All that is needed is that the microchip be positioned close enough to the inflating pump and/or nozzle that the information on the microchip can be read by the system. Also, the transceiver that reads the microchip can be located differently than shown and described. As just one example, it can be located on or in the pump body instead of the nozzle assembly, and be connected to its antenna via the electrical wires.

The "valve stem" can be any suitable inflation port in the inflatable article, and not just the conventional valve stem form that is shown and described. It should be understood that the inflation port can connect the inflatable article to the air source without the inflation port actually touching the article, such as when a tire valve stem is placed in a wheel to allow a connection between the tire and the air source.

The pressure transducer/sensor that measures the current pressure of the inflatable article can be located in the pump body, the air hose, or the nozzle assembly—basically, it can be located anywhere that it can suitably measure the current pressure of the inflatable article. Similarly, the means for shutting off the incoming air flow once the article reaches the desired pressure can be located on the nozzle, the air hose, the pump body, or anywhere else where it can suitably shut off the incoming air flow, and the shutoff means can be automatic or user-operated.

Accordingly, the scope of the invention should be determined not by the embodiments illustrated, but by the appended claims and their legal equivalents.

What is claimed is:

1. A system for inflating an article, comprising:
    (a) an inflating pump adapted to supply a stream of compressed fluid through a nozzle connected thereto;
    (b) an inflation port adapted to connect said article and said nozzle in order to inflate said article, said nozzle being separable from said article;
    (c) a microchip associated with said article, said microchip having a desired inflation pressure setting located thereon, such that the desired inflation pressure setting is obtained from the article; and
    (d) means for wirelessly reading said desired inflation pressure setting from said microchip and inflating said article according to said desired inflation pressure setting.

2. The system of claim 1, wherein said microchip is a radio frequency identification tag.

3. The system of claim 1, wherein said microchip is attached to said inflation port.

4. The system of claim 1, wherein said article is a vehicle tire.

5. The system of claim 1, wherein said system also comprises means for indicating whether a front or rear inflation pressure setting is desired, and said desired inflation pressure setting includes said front or rear inflation pressure setting.

6. The system of claim 1, wherein said system also comprises means for indicating a passenger weight of a vehicle, and said desired inflation pressure setting includes an inflation pressure setting corresponding to said passenger weight.

7. The system of claim 1, wherein said system also comprises means for indicating a preferred driving mode for a vehicle, and said desired inflation pressure setting includes an inflation pressure setting corresponding to said preferred driving mode.

8. An inflation port for inflating an article, comprising:
    (a) a main body having a through-opening with a first end and a second end, said first end adapted to connect with an inflating pump having a nozzle and said second end adapted to connect with said article, said nozzle being separable from said article, and
    (b) a microchip attached to said main body, said microchip having desired inflation pressure setting located thereon, such that the desired inflation pressure setting is obtained from the article.

9. The inflation port of claim 8, wherein said microchip is a radio frequency identification tag.

10. The inflation port of claim 8, wherein said article is a vehicle tire.

11. The inflation port of claim 8, wherein said desired inflation pressure setting includes a front or rear inflation pressure setting.

12. The inflation port of claim 8, wherein said desired inflation pressure setting includes an inflation pressure setting corresponding to a passenger weight of a vehicle.

13. The inflation port of claim 8, wherein said desired inflation pressure setting includes an inflation pressure setting corresponding to a preferred driving mode for a vehicle.

14. A method of inflating an article, comprising the steps of:
   (a) accessing an inflating pump, said inflating pump supplying a stream of compressed fluid;
   (b) placing a nozzle of said inflating pump onto an inflation port that connects said nozzle and said article, said nozzle being separable from said article;
   (c) determining a desired inflation pressure by wirelessly reading a desired inflation pressure setting on a microchip associated with said article, such that the desired inflation pressure setting is obtained from the article; and
   (d) inflating said article with said stream of compressed fluid to said desired inflation pressure setting obtained from said microchip.

15. The method of claim 14, wherein said method also comprises the step of shutting off said stream of compressed fluid after said article has been inflated to said desired inflation pressure.

16. The method of claim 14, wherein said method also comprises the step of indicating whether a front or rear inflation pressure setting is desired, and said determining step comprises reading said desired inflation pressure setting corresponding to said front or rear indication.

17. The method of claim 14, wherein said method also comprises the step of indicating the passenger weight of a vehicle, and said determining step comprises reading said desired inflation pressure setting corresponding to said passenger weight from said microchip or calculating said desired inflation pressure setting corresponding to said passenger weight.

18. The method of claim 14, wherein said method also comprises the step of indicating the preferred driving mode for a vehicle, and said determining step comprises reading said desired inflation pressure setting corresponding to said preferred driving mode from said microchip.

19. The method of claim 14, wherein said article is a vehicle tire.

20. The method of claim 16, wherein said article is a vehicle tire.

* * * * *